United States Patent
Dharmarajan et al.

(10) Patent No.: US 6,953,828 B2
(45) Date of Patent: Oct. 11, 2005

(54) POLYMERIC MEMBRANE COMPOSITIONS

(75) Inventors: Raja N. Dharmarajan, Houston, TX (US); Thomas C. Yu, Santa Monica, CA (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 146 days.

(21) Appl. No.: 10/489,568

(22) PCT Filed: Sep. 3, 2002

(86) PCT No.: PCT/US02/27968

§ 371 (c)(1),
(2), (4) Date: Mar. 11, 2004

(87) PCT Pub. No.: WO03/033585

PCT Pub. Date: Apr. 24, 2003

(65) Prior Publication Data

US 2004/0204547 A1 Oct. 14, 2004

Related U.S. Application Data

(60) Provisional application No. 60/329,405, filed on Oct. 15, 2001.

(51) Int. Cl.[7] .............................. C08F 8/00; C08L 9/00; C08L 23/00; C08L 23/04; C08L 33/24
(52) U.S. Cl. ..................... 525/191; 525/218; 525/232; 525/240
(58) Field of Search ................................ 525/191, 218, 525/232, 240

(56) References Cited

U.S. PATENT DOCUMENTS

| | | |
|---|---|---|
| 5,006,383 A | 4/1991 | Achille et al. |
| 6,002,064 A | 12/1999 | Kobylivker et al. |
| 6,072,005 A | 6/2000 | Kobylivker et al. |
| 6,407,171 B1 | 6/2002 | Agarwal et al. |

FOREIGN PATENT DOCUMENTS

| | | |
|---|---|---|
| EP | 0 850 756 | 7/1998 |
| JP | 07278377 | 10/1995 |
| JP | 08311271 | 11/1996 |
| JP | 2000063581 | 2/2000 |
| WO | WO 92 14784 | 9/1992 |
| WO | WO 98 54260 | 12/1998 |

*Primary Examiner*—Nathan M. Nutter
(74) *Attorney, Agent, or Firm*—Andrew B. Griffis

(57) ABSTRACT

Blends of very low density polyethylene produced using metallocene catalysts (mVLDPE) and polypropylene are disclosed. The polymer blends include a metallocene-catalyzed VLDPE polymer having a density of less than 0.916 g/cm$^3$, the mVLDPE polymer preferably being linear and without long chain branching, a polypropylene homopolymer, random copolymer, or impact copolymer, and optionally flame retardant additives. The polymer blends are particularly suitable in membrane applications where increased tear resistance and tensile strength are desirable, such as in roof membranes, geomembranes, and pond liners.

55 Claims, No Drawings

POLYMERIC MEMBRANE COMPOSITIONS

This application claims benefit of U.S. Provisional App. No. 60/329,405, filed Oct. 15, 2001.

1. FIELD OF THE INVENTION

The present invention relates generally to polymer blends suitable for use in roofing applications. More specifically, the present invention is directed to blends of very low density polyethylene produced using metallocene catalysts, and polypropylene homopolymers or copolymers, and membranes such as roofing membranes, geomembranes and pond liners formed of such blends.

2. BACKGROUND

Thermoplastic polyolefins ("TPO") are widely used in membrane applications. In roofing applications in particular, the use of TPO-based membranes is rapidly growing. Most TPO roofing membranes include a fabric or scrim coated on both sides with polymer compounds based on polypropylene reactor copolymers. The top layer, which is often white, is formulated with non-halogen flame-retardants (predominantly magnesium hydroxide), UV stabilizers, antioxidants and pigments (titanium di-oxide). The bottom layer is generally polymer-rich. The white top layer reflects sunlight and prevents thermal heating inside the building, thereby reducing air conditioning costs. Ability to formulate white compounds is an advantage for TPO over some other roofing systems. TPO membranes are heat welded directly on the roof to form large sheets. This process eliminates the need for expensive solvent-based adhesives that are commonly used in other single-ply roofing. Because of the widespread use of TPO membranes in roofing and other applications under environmentally harsh conditions, it is particularly desirable to improve membrane properties, such as strength and tear resistance.

Blends of metallocene catalyzed plastomers with polypropylene in membrane applications are known. For example, EXACT™ 0201 and EXACT™ 8201 (metallocene-catalyzed ethylene-octene plastomers having densities of 0.902 g/cm$^3$ and 0.882 g/cm$^3$, respectively, available from ExxonMobil Chemical Co., Houston, Tex.) have been used in blends with a polypropylene impact copolymer to form membranes suitable for roofing applications. (N. Dharmarajan, T. C. Yu and D. K. Metzler, "Metallocene Plastomer Based Thermoplastic Olefin Compounds for Roof Membrane Applications", Society of Plastics Engineers (SPE) ANTEC 2001 Meeting, May 2001, Dallas, Tex.) The plastomer-polypropylene compositions are said to have a good balance of mechanical properties, notably tensile strength and tear resistance, as well as other desirable properties.

Other background references include WO 92/14784; WO 98/54260; Patent Abstracts of Japan, vol. 2000, no. 05 (2000-09-14) & JP 2000 063581 (2000-02-29); Patent Abstracts of Japan, vol. 1996, no. 02 (1996-02-29) & JP 07 278377A (1995-10-24); EP 0 850 756; Patent Abstracts of Japan, vol. 1997, no. 03 (1997-03-31) & JP 08 311271A (1996-11-26); and U.S. Pat. No. 5,006,383.

It would be desirable to have polymer blend compositions suitable for membrane applications, wherein the membrane would have further improved tensile strength and tear resistance. Improved tensile strength and tear resistance would provide superior wind uplift resistance to the olefin membrane (resistance to high velocity winds) and the potential to downgauge to reduce composite thickness. It would further be desirable to provide polymer blend compositions suitable for membrane applications, wherein the compositions can be formulated at lower cost, without sacrificing ultimate membrane properties.

3. SUMMARY

In one embodiment, the present invention is directed to a membrane, such as a pond liner, a geomembrane or a roofing membrane, formed of a polymer blend. The blend includes a metallocene-catalyzed very low density polyethylene (mVLDPE) polymer having a density of from 0.906 g/cm$^3$ or greater to 0.915 g/cm$^3$ or less, and a polypropylene (PP) component. The mVLDPE and PP components are present in the blend composition in a weight ratio of from 9:1 to 1:9, or from 9:1 to 1:1.

In another embodiment, the present invention is directed to a membrane, such as but not limited to a roofing membrane, pond liner or geomembrane, formed of a polymer blend. The blend includes a metallocene-catalyzed very low density polyethylene (mVLDPE) polymer having a density of from 0.906 to 0.915 g/cm$^3$, and a polypropylene (PP) component including at least one of a polypropylene homopolymer and a polypropylene/ethylene copolymer having a polymerized ethylene content of from 0.5 to 40 wt. %. The mVLDPE and PP components are present in the blend composition in a weight ratio of from 9:1 to 1:9, or from 9:1 to 1:1.

In another embodiment, the present invention is directed to a composite membrane having first and second layers formed of the mVLDPE/PP blends described herein, and an intermediate polymeric reinforcing layer of, for example, polyester or polypropylene fabric.

In other embodiments, the present invention is directed to any of the membranes and composite membranes described above, wherein the metallocene-catalyzed VLDPE polymer (mVLDPE) is produced using an unbridged biscyclopentadienyl metallocene catalyst system.

In other embodiments, the present invention is directed to any of the membranes and composite membranes described above, wherein the mVLDPE polymer is a copolymer of ethylene and at least one C$_{3-20}$ alpha-olefin, and has at least one of: (i) a comonomer content of from 5 to 15 wt. %; (ii) a composition distribution breadth index of from 50% to 85%; (iii) a molecular weight distribution Mw/Mn of from 2 to 3; (iv) a molecular weight distribution Mz/Mw of less than 2; and (v) a bimodal composition distribution.

4. DETAILED DESCRIPTION

4.1 The mVLDPE Component

The polymer blends and membranes of the present invention include a metallocene catalyzed very low density polyethylene (mVLDPE) polymer. As used herein, the terms "very low density polyethylene" polymer and "VLDPE" polymer refer to a polyethylene copolymer having a density of less than 0.916 g/cm$^3$. As used herein, the term "polyethylene copolymer" indicates a polymer formed of more than 50 mol % polymerized ethylene units, and the remaining less than 50 mol % polymerized units being polymerized α-olefin comonomers, such as C$_{3-20}$ α-olefins or C$_{3-12}$ α-olefins. The α-olefin comonomer can be linear or branched, and two or more comonomers can be used, if desired. Examples of suitable comonomers include linear C$_{3-12}$ α-olefins, and α-olefins having one or more C$_{1-3}$ alkyl branches, or an aryl group. Specific examples include propylene; 1-butene, 3-methyl-1-butene; 3,3-dimethyl-1- butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene, more preferably 1-butene, 1-hexene, and 1-octene.

Although not generally preferred, other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbomadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the mVLDPE polymer and the specific comonomers selected. For one embodiment of the mVLDPE polymer comprising an ethylene/butene copolymer, the molar ratio of butene to ethylene should be from about 0.015 to 0.035, preferably from 0.020 to 0.030. For one embodiment of the mVLDPE polymer comprising an ethylene/hexene copolymer, the molar ratio of hexene to ethylene should be from about 0.015 to 0.035, preferably from 0.020 to 0.030. For one embodiment of the mVLDPE polymer comprising an ethylene/octene copolymer, the molar ratio of octene to ethylene should be from about 0.015 to 0.035, preferably from 0.020 to 0.030. In general, the comonomer may be present in an amount of 25% or less by weight, preferably 20% or less by weight and more preferably 15% or less by weight. In one embodiment, the comonomer may be present in an amount of 5% or more by weight. It is well-understood in the art that, for a given comonomer, the density of the mVLDPE polymer produced therefrom decreases as the comonomer content increases. One skilled in the art can readily determine the appropriate comonomer content appropriate to produce a VLDPE polymer having a desired density.

The mVLDPE polymer has a density of less than 0.916 g/cm$^3$, and preferably greater than 0.905 g/cm$^3$. Thus, a preferred density range for the mVLDPE polymer is 0.906 g/cm$^3$ to 0.915 g/cm$^3$. Alternate lower limits of the mVLDPE polymer density include 0.908 g/cm$^3$ or 0.910 g/cm$^3$. Alternative upper limits of the mVLDPE polymer include 0.912 g/cm$^3$ or 0.914 g/cm$^3$. Use of higher density ethylene copolymers, such as LLDPEs having a density of at least 0.916 g/cm$^3$, would result in membranes having an undesirable increased stiffness, leading to flexibility problems in flexible membrane applications.

The mVLDPE polymer is further characterized by a melt index (MI) of from 0.5 to 20 g/10 min (dg/min), as measured in accordance with ASTM-1238 condition E ($I_{2.16}$, 190° C.). In one or more specific embodiments, alternative lower limits for the melt index include 0.7 and 1.0 g/10 min, and alternative upper limits for the melt index include 5, 10, 12 and 15 g/10 min, with melt index ranges from any lower limit to any upper limit being within the scope of the invention.

As used herein, the terms "metallocene-catalyzed VLDPE," "metallocene-produced VLDPE," or "mVLDPE" refer to a VLDPE polymer having the density and melt index properties described herein, and being produced in the presence of a metallocene catalyst. One skilled in the art will recognize that a metallocene-catalyzed VLDPE polymer has measurable properties distinguishable from a VLDPE polymer having the same comonomers in the same weight percentages but produced from a different process, such as a conventional Ziegler-Natta polymerization process.

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. The metallocene catalyst precursor is preferably one of, or a mixture of metallocene compounds of either or both of the following types:

Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

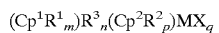

wherein: Cp$^1$ and Cp$^2$ are the same or different cyclopentadienyl rings; R$^1$ and R$^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1{}_m)R^3{}_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organo-metalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the mVLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

μ-(CH$_3$)$_2$Si(indenyl)$_2$M(Cl)$_2$;
μ-(CH$_3$)$_2$Si(indenyl)$_2$M(CH$_3$)$_2$;
μ-(CH$_3$)$_2$Si(tetrahydroindenyl)$_2$M(Cl)$_2$;
μ-(CH$_3$)$_2$Si(tetrahydroindenyl)$_2$M(CH$_3$)$_2$;
μ-(CH$_3$)$_2$Si(indenyl)$_2$M(CH$_2$CH$_3$)$_2$; and
μ-(C$_6$H$_5$)$_2$C(indenyl)$_2$M(CH$_3$)$_2$;
wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-(C$_6$H$_5$)$_2$C(cyclopentadienyl)(fluorenyl)M(R)$_2$;
μ-(C$_6$H$_5$)$_2$C(3-methylcyclopentadienyl)(fluorenyl)M(R)$_2$;
μ-(CH$_3$)$_2$C(cyclopentadienyl)(fluorenyl)M(R)$_2$;
μ-(C$_6$H$_5$)$_2$C(cyclopentadienyl)(2-methylindenyl)M(CH$_3$)$_2$;
μ-(C$_6$H$_5$)$_2$C(3-methylcyclopentadienyl)(2-methylindenyl)M(Cl)$_2$;
μ-(C$_6$H$_5$)$_2$C(cyclopentadienyl)(2,7-dimethylfluorenyl)M(R)$_2$; and
μ-(CH$_3$)$_2$C(cyclopentadienyl)(2,7-dimethylfluorenyl)M(R)$_2$;
wherein M is Zr or Hf, and R is Cl or CH$_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of preferred monocyclopentadienyl metallocenes of the type described in group (2) above are:

μ-(CH$_3$)$_2$Si(cyclopentadienyl)(1-adamantylamido)M(R)$_2$;
μ-(CH$_3$)$_2$Si(3-tertbutylcyclopentadienyl)(1-adamantylamido)M(R)$_2$;
μ-(CH$_2$(tetramethylcyclopentadienyl)(1-adamantylamido)M(R)$_2$;
μ-(CH$_3$)$_2$Si(tetramethylcyclopentadienyl)(1-adamantylamido)M(R)$_2$;
μ-(CH$_3$)$_2$C(tetramethylcyclopentadienyl)(1-adamantylamido)M(R)$_2$;
μ-(CH$_3$)$_2$Si(tetramethylcyclopentadienyl)(1-tertbutylamido)M(R)$_2$;
μ-(CH$_3$)$_2$Si(fluorenyl)(1-tertbutylamido)M(R)$_2$;
μ-(CH$_3$)$_2$Si(tetramethylcyclopentadienyl)(1-cyclododecylamido)M(R)$_2$; and
μ-(C$_6$H$_5$)$_2$C(tetramethylcyclopentadienyl)(1-cyclododecylamido)M(R)$_2$;
wherein M is Ti, Zr or Hf, and R is Cl or CH$_3$.

Other organometallic complexes that are useful catalysts for the mVLDPE polymers described herein are those with diimido ligand systems, such as are described in WO 96/23010. Other references describing suitable organometallic complexes include Organometallics, 1999, 2046; PCT publications WO 99/14250, WO 98/50392, WO 98/41529, WO 98/40420, WO 98/40374, WO 98/47933; and European publications EP 0 881 233 and EP 0 890 581.

The metallocene compounds and/or other organometallic complexes are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:
trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate; and
tri(n-butyl)ammonium tetrakis(o-tolyl)borate;
N,N-dialkyl anilinium salts such as:
N,N-dimethylanilinium tetrakis(pentafluorophenyl)borate;
N,N-dimethylaniliniumtetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate; and
N,N-2,4,6-pentamethylanilinium tetraphenylborate;
dialkyl ammonium salts such as:
di-(isopropyl)ammonium tetrakis(pentafluorophenyl)borate; and
dicyclohexylammonium tetraphenylborate; and
triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:
tropillium tetrakis(pentafluorophenyl)borate;
triphenylmethylium tetrakis(pentafluorophenyl)borate;
benzene (diazonium) tetrakis(pentafluorophenyl)borate;
tropillium phenyltris(pentafluorophenyl)borate;
triphenylmethylium phenyl-(trispentafluorophenyl)borate;
benzene (diazonium) phenyl-tris(pentafluorophenyl)borate;
tropillium tetrakis(2,3,5,6-tetrafluorophenyl)borate;
triphenylmethylium tetrakis(2,3,5,6-tetrafluorophenyl)borate;
benzene (diazonium) tetrakis(3,4,5-trifluorophenyl)borate;
tropillium tetrakis(3,4,5-trifluorophenyl)borate;
benzene (diazonium) tetrakis(3,4,5-trifluorophenyl)borate;
tropillium tetrakis(3,4,5-trifluorophenyl)aluminate;
triphenylmethylium tetrakis(3,4,5-trifluorophenyl)aluminate;
benzene (diazonium) tetrakis(3,4,5-trifluorophenyl)aluminate;
tropillinum tetrakis(1,2,2-trifluoroethenyl)borate;
triphenylmethylium tetrakis(1,2,2-trifluoroethenyl)borate;
benzene (diazonium) tetrakis(1,2,2-trifluoroethenyl)borate;
tropillium tetrakis(2,3,4,5-tetrafluorophenyl)borate;
triphenylmethylium tetrakis(2,3,4,5-tetrafluorophenyl)borate; and
benzene (diazonium) tetrakis(2,3,4,5-tetrafluorophenyl)borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R\text{---}Al\text{---}O)_n$, which is a cyclic compound, or $R(R\text{---}Al\text{---}O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst.

The catalyst system is optionally supported, typically on an inorganic oxide or chloride or a material such as polyethylene, polypropylene or polystyrene. These catalysts can include partially and/or fully activated precursor compositions. The catalysts may be modified by prepolymerization or encapsulation. Specific metallocenes and catalyst systems useful in practicing the invention are disclosed in WO 96/11961, and WO 96/11960. Other non-limiting examples of metallocene catalysts and catalyst systems are discussed in U.S. Pat. Nos. 4,808,561, 5,017,714, 5,055,438, 5,064,802, 5,124,418, 5,153,157 and 5,324,800. Still other organometallic complexes and/or catalyst systems are described in Organometallics, 1999, 2046; PCT publications WO 96/23010, WO 99/14250, WO 98/50392, WO 98/41529, WO 98/40420, WO 98/40374, WO 98/47933; and European publications EP 0 881 233 and EP 0 890 581.

In a preferred embodiment, the mVLDPE polymer is made using a gas-phase, metallocene-catalyzed polymerization process. As used herein, the term "gas phase polymerization" refers to polymerization of monomers in a fluidized bed. In this embodiment, the mVLDPE polymer may be made by polymerizing alpha-olefins in the presence of a metallocene catalyst under reactive conditions in a gas phase reactor having a fluidized bed and a fluidizing medium. In a specific embodiment, the mVLDPE polymer can be made by polymerization in a single reactor (as opposed to multiple reactors). As discussed in greater detail below, a variety of gas phase polymerization processes may be used. For example, polymerization may be conducted in uncondensed or "dry" mode, condensed mode, or "super-condensed mode." In a specific embodiment, the liquid in the fluidizing medium can be maintained at a level greater than 2 weight percent based on the total weight of the fluidizing medium.

The material exiting the reactor includes the mVLDPE polymer and a stream containing unreacted monomer gases. Following polymerization, the polymer is recovered. In certain embodiments, the stream can be compressed and cooled, and mixed with feed components, whereupon a gas phase and a liquid phase are then returned to the reactor.

Generally, in carrying out the gas phase polymerization processes described herein, the reactor temperature can be in the range of 50° C. to 110° C., sometimes higher. However, the reactor temperature should not exceed the melting point of the mVLDPE being formed. A typical reactor temperature is 80° C. The reactor pressure should be 100 to 1000 psig (0.7 to 7 MPa), preferably 150 to 600 psig (1 to 4 MPa), more preferably 200 to 500 psig (1.4 to 3.5 MPa) and most preferably 250 to 400 psig (1.7 to 2.8 MPa).

Preferably, the process is operated in a continuous cycle. A specific, non-limiting embodiment of the gas phase polymerization process that is operated in a continuous cycle will now be described, it being understood that other forms of gas polymerization may also be used.

A gaseous stream containing one or more monomers is continuously passed through a fluidized bed under reactive conditions in the presence of a catalyst as described above. This gaseous stream is withdrawn from the fluidized bed and recycled back into the reactor. Simultaneously, polymer product may be withdrawn from the reactor and new monomer or monomers are added to replace the reacted monomer(s). In one part of the cycle, in a reactor, a cycling gas stream is heated by the heat of polymerization. This heat is removed in another part of the cycle by a cooling system external to the reactor. Heat generated by the reaction may be removed in order to maintain the temperature of the gaseous stream inside the reactor at a temperature below the polymer and catalyst degradation temperatures. Further, it is often desirable to prevent agglomeration or formation of chunks of polymer that cannot be removed as product. This may be accomplished in a variety of ways known in the art, such as, for example, through control of the temperature of the gaseous stream in the reaction bed to a temperature below the fusion or sticking temperature of the polymer particles produced during the polymerization reaction.

Heat should be removed, since the amount of polymer produced in the fluidized bed polymerization process is generally related to the amount of heat that can be withdrawn from a reaction zone in a fluidized bed within the reactor. During the gas phase polymerization process, heat can be removed from the gaseous recycle stream by cooling the stream outside the reactor. The velocity of the gaseous recycle stream in a fluidized bed process should be sufficient to maintain the fluidized bed in a fluidized state. In certain conventional fluidized bed reactors, the amount of fluid circulated to remove the heat of polymerization is often greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream should be regulated.

The recycle stream can be cooled to a temperature below the dew point, resulting in condensing a portion of the recycle stream, as described in U.S. Pat. Nos. 4,543,399 and 4,588,790. As set forth in those patents, the resulting stream containing entrained liquid should be returned to the reactor without the aforementioned agglomeration and/or plugging that may occur when a liquid is introduced during the fluidized bed polymerization process. For purposes of this patent, this intentional introduction of a liquid into a recycle stream or reactor during the process is referred to generally as a "condensed mode" operation of the gas phase polymerization process. As taught by the above mentioned patents, when a recycle stream temperature is lowered to a point below its dew point in condensed mode operation, an increase in polymer production is possible, as compared to production in a "non-condensing" or "dry" mode, because of increased cooling capacity. Also, a substantial increase in space time yield, the amount of polymer production in a given reactor volume, can be achieved by operating in condensed mode with little or no change in product properties. Also, in certain condensed mode operations, the liquid phase of the two-phase gas/liquid recycle stream mixture remains entrained or suspended in the gas phase of the mixture. The cooling of the recycle stream to produce this two-phase mixture results in a liquid/vapor equilibrium. Vaporization of the liquid occurs when heat is added or pressure is reduced. The increase in space time yields are the result of this increased cooling capacity of the recycle stream which, in turn, is due both to the greater temperature differential between the entering recycle stream and the fluidized bed temperature and to the vaporization of condensed liquid entrained in the recycle stream. In a specific non-limiting embodiment of the process described herein, a condensed mode of operation is utilized.

In operating the gas phase polymerization process to obtain the mVLDPE polymer, the amount of polymer and catalyst, the operating temperature of the reactor, the ratio of comonomer(s) to monomer and the ratio of hydrogen to monomer should be determined in advance, so that the desired density and melt index can be achieved.

Although a variety of gas polymerization processes may be used to make the polyolefins of the present inventions, including non-condensed or dry mode, it is preferred to use any one of a variety of condensed mode processes, including the condensed mode processes described in the above patents, as well as improved condensed mode gas polymerization processes, such as those disclosed in U.S. Pat. Nos. 5,462,999, and 5,405,922. Other types of condensed mode processes are also applicable, including so-called "super-condensed mode" processes, as discussed in U.S. Pat. Nos. 5,352,749 and 5,436,304.

The condensable fluids that can be used in one of the condensed mode gas phase polymerization operations may include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, or mixtures thereof. The preferred inert condensable hydrocarbons are $C_4$ and $C_6$ saturated hydrocarbons. The condensable fluids may also include polymerizable condensable comonomers such as olefins, alpha-olefins, diolefins, diolefins containing at least one alpha-olefin or mixtures thereof including some of the aforementioned monomers which may be partially or entirely incorporated into the polymer product.

The preferred gas-phase, metallocene VLDPE polymers can be further characterized by a narrow composition distribution. As is well known to those skilled in the art, the composition distribution of a copolymer relates to the uniformity of distribution of comonomer among the molecules of the polymer. Metallocene catalysts are known to incorporate comonomer very evenly among the polymer molecules they produce. Thus, copolymers produced from a catalyst system having a single metallocene component have a very narrow composition distribution, in that most of the polymer molecules will have roughly the same comonomer content, and within each molecule the comonomer will be randomly distributed. By contrast, conventional Ziegler-Natta catalysts generally yield copolymers having a considerably broader composition distribution, with comonomer inclusion varying widely among the polymer molecules.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a $Mn \geq 15,000$, where Mn is the number average molecular weight of the fraction. Any low weight fractions present generally represent a trivial portion of the mVLDPE polymers. The remainder of this description and the appended claims maintain this convention of assuming all fractions have $Mn \geq 15,000$ in the CDBI measurement.

The mVLDPE polymers can also be characterized by molecular weight distribution (MWD). Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems 3rd ed.*, Hemisphere Pub. Corp., NY, (1989) 155–160; U.S. Pat. No. 4,540,753; Verstrate et al., *Macromolecules*, vol. 21, (1988) 3360; and references cited therein.

The mVLDPE polymers are preferably linear polymers without long chain branching. As used in the present disclosure, the term "linear" is applied to a polymer that has a linear backbone and does not have long chain branching; i.e., a "linear" polymer is one that does not have the long chain branches characteristic of a SLEP polymer as defined in U.S. Pat. Nos. 5,272,236 and 5,278,272. Thus, a "substantially linear" polymer as disclosed in those patents is not a "linear" polymer because of the presence of long chain branching.

In one embodiment, the mVLDPE polymer has one or more of the following characteristics, in addition to the density and other parameters described herein:

a composition distribution CDBI in a range from a lower limit of 50% or 55% or 60% to an upper limit of 85%, or 80%, or 75%, or 70%, with ranges from any lower limit to any upper limit being contemplated;

a molecular weight distribution Mw/Mn of 2 to 3, alternatively 2.2 to 2.8;

a molecular weight distribution Mz/Mw of less than 2; and the presence of two peaks in a TREF measurement.

Particularly preferred mVLDPEs having some or all of these characteristics are the gas phase metallocene-produced VLDPEs described above.

Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method disclosed in the EXAMPLES section below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement than can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491–499 (1994).

A preferred balance of properties, particularly in film applications, according to the invention is achieved when the long chain branching of the mVLDPE is reduced. Therefore, with respect to the catalyst structures described above, bis-Cp structures are preferred over mono-Cp structures, unbridged structures are preferred over bridged structures, and unbridged bis-Cp structures are the most preferred. Preferred catalyst systems which will minimize or eliminate long chain branching to produce polymers substantially free of or free of long chain branching are based on un-bridged bis-Cp zirconocenes, such as but not limited to bis (1-methyl-3-n-butyl cyclopentadiane) zirconium dichloride.

Symmetric metallocenes may be used to produce an mVLDPE polymer of the present invention. Symmetric metallocenes include, but are not limited to:
bis(methylcyclopentadienyl)zirconium dichloride,
bis(1,3-dimethylcyclopentadienyl)zirconium dichloride,
bis(1,2-dimethylcyclopentadienyl)zirconium dichloride,
bis(1,2,4-trimethylcyclopentadienyl)zirconium dichloride,
bis(1,2,3-trimethylcyclopentadienyl)zirconium dichloride,
bis(tetramethylcyclopentadienyl)zirconium dichloride,
bis(pentamethylcyclopentadienyl)zirconium dichloride,
bis(ethylcyclopentadienyl)zirconium dichloride,
bis(propylcyclopentadienyl)zirconium dichloride,
bis(butylcyclopentadienyl)zirconium dichloride,
bis(isobutylcyclopentadienyl)zirconium dichloride,
bis(pentylcyclopentadienyl)zirconium dichloride,
bis(isopentylcyclopentadienyl)zirconium dichloride,
bis(cyclopentylcyclopentadienyl)zirconium dichloride
bis(phenylcyclopentadienyl)zirconium dichloride,
bis(benzylcyclopentadienyl)zirconium dichloride,
bis(trimethylsilylmethylcyclopentadienyl)zirconium dichloride,
bis(cyclopropylmethylcyclopentadienyl)zirconium dichloride,
bis(cyclopentylmethylcyclopentadienyl)zirconium dichloride,
bis(cyclohexylmethylcyclopentadienyl)zirconium dichloride,
bis(propenylcyclopentadienyl)zirconium dichloride,
bis(butenylcyclopentadienyl)zirconium dichloride,
bis(1,3-ethylmethylcyclopentadienyl)zirconium dichloride,
bis(1,3-propylmethylcyclopentadienyl)zirconium dichloride,
bis(1,3-butylmethylcyclopentadienyl)zirconium dichloride,
bis(1,3-isopropylmethylcyclopentadienyl)zirconium dichloride,
bis(1,3-isobutylmethylcyclopentadienyl)zirconium dichloride,
bis(1,3-methylcyclopentylcyclopentadienyl)zirconium dichloride, and
bis(1,2,4-dimethylpropylcyclopentadienyl)zirconium dichloride.

Unsymmetric metallocenes may be used to produce an mVLDPE polymer of the present invention. Unsymmetric metallocenes include, but are not limited to:
cyclopentadienyl(1,3-dimethylcyclopentadienyl)zirconium dichloride,
cyclopentadienyl(1,2,4-trimethylcyclopentadienyl) zirconium dichloride,
cyclopentadienyl(tetramethylcyclopentadienyl)zirconium dichloride,
cyclopentadienyl(pentamethylcyclopentadienyl)zirconium dichloride,
cyclopentadienyl(propylcyclopentadienyl)zirconium dichloride, cyclopentadienyl(butylcyclopentadienyl)zirconium dichloride,
cyclopentadienyl(pentylcyclopentadienyl)zirconium dichloride,
cyclopentadienyl(isobutylcyclopentadienyl)zirconium dichloride,
cyclopentadienyl(cyclopentylcyclopentadienyl)zirconium dichloride,
cyclopentadienyl(isopentylcyclopentadienyl)zirconium dichloride,
cyclopentadienyl(benzylcyclopentadienyl)zirconium dichloride,
cyclopentadienyl(phenylcyclopentadienyl)zirconium dichloride,
cyclopentadienyl(1,3-propylmethylcyclopentadienyl) zirconium dichloride,
cyclopentadienyl(1,3-butylmethylcyclopentadienyl) zirconium dichloride,
cyclopentadienyl(1,3-isobutylmethylcyclopentadienyl) zirconium dichloride,
cyclopentadienyl(1,2,4-dimethylpropylcyclopentadienyl) zirconium dichloride,
(tetramethylcyclopentadienyl)(methylcyclopentadienyl) zirconium dichloride,
(tetramethylcyclopentadienyl)(1,3-dimethylcyclopentadienyl)zirconium dichloride,
(tetramethylcyclopentadienyl)(1,2,4-trimethylcyclopentadienyl)zirconium dichloride,
(tetramethylcyclopentadienyl)(propylcyclopentadienyl) zirconium dichloride,
(tetramethylcyclopentadienyl)(cyclopentylcyclopentadienyl)zirconium dichloride,
(pentamethylcyclopentadienyl)(methylcyclopentadienyl) zirconium dichloride,
(pentamethylcyclopentadienyl)(1,3-dimethylcyclopentadienyl)zirconium dichloride,
(pentamethylcyclopentadienyl)(1,2,4-trimethylcyclopentadienyl)zirconium dichloride,
(pentamethylcyclopentadienyl)(propylcyclopentadienyl) zirconium dichloride,
(pentamethylcyclopentadienyl)(cyclopentylcyclopentadienyl)zirconium dichloride,
cyclopentadienyl(ethyltetramentylcyclopentadienyl) zirconium dichloride,
cyclopentadienyl(propyltetramentylcyclopentadienyl) zirconium dichloride,
(methylcyclopentadienyl)(propyltetramentylcyclopentadienyl)zirconium dichloride,
(1,3-dimethylcyclopentadienyl)(propyltetramentylcyclopentadienyl)-zirconium dichloride,
(1,2,4-trimethylcyclopentadienyl)(propyltetramentylcyclopentadienyl)-zirconium dichloride,
(propylcyclopentadienyl)(propyltetramentylcyclopentadienyl)zirconium dichloride,
cyclopentadienyl(indenyl)zirconium dichloride,
(methylcyclopentadienyl)(indenyl)zirconium dichloride,
(1,3-dimethylcyclopentadienyl)(indenyl)zirconium dichloride,
(1,2,4-trimethylcyclopentadienyl)(indenyl)zirconium dichloride,
(tetramethylcyclopentadienyl)(indenyl)zirconium dichloride,
(pentamethylcyclopentadienyl)(indenyl)zirconium dichloride,
cyclopentadienyl(1-methylindenyl)zirconium dichloride,
cyclopentadienyl(1,3-dimethylindenyl)zirconium dichloride,
cyclopentadienyl(1,2,3-trimethylindenyl)zirconium dichloride,
cyclopentadienyl(4,7-dimethylindenyl)zirconium dichloride,
(tetramethylcyclopentadienyl)(4,7-dimethylindenyl) zirconium dichloride,
(pentamethylcyclopentadienyl)(4,7-dimethylindenyl) zirconium dichloride,
cyclopentadienyl(5,6-dimethylindenyl)zirconium dichloride,
(pentamethylcyclopentadienyl)(5,6-dimethylindenyl) zirconium dichloride, and
(tetramethylcyclopentadienyl)(5,6-dimethylindenyl) zirconium dichloride.

The preferred method for producing the catalyst is described below and can be found in U.S. application Ser. No. 265,533, filed Jun. 24, 1994, now abandoned, and Ser. No. 265,532, filed Jun. 24, 1994, now abandoned, both of which are hereby incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and more preferably in the 1–1.5 times to 2.5–4 times range and most preferably in the 1.5 to 3 times range. Also, in the preferred embodiment, an antistatic agent is added to the catalyst preparation.

In one embodiment, the metallocene catalyst is prepared from silica dehydrated at 600° C. The catalyst is a commercial scale catalyst prepared in a mixing vessel with and agitator. An initial charge of 1156 pounds (462 kg) toluene is added to the mixer. This was followed by mixing 925 pounds (421 kg) of 30 percent by weight methyl aluminoxane in toluene. This is followed with 100 pounds (46 kg) of 20 percent by weight bis(1,3-methyl-n-butyl cyclopentadienyl) zirconium dichloride in toluene (20.4 pounds (9.3 kg) of contained metallocene). An additional 144 pounds (66 kg) of toluene is added to the mixer to rinse the metallocene feed cylinder and allowed to mix for 30 minutes at ambient conditions. This is followed by 54.3 pounds (25 kg) of an AS-990 in toluene, surface modifier solution, containing 5.3 pounds (2.4 kg) of contained AS-990. An additional 100 pounds (46 kg) of toluene rinsed the surface modifier container and was added to the mixer. The resulting slurry is vacuum dried at 3.2 psia (70.6 kPa) at 175° F. (79° C.) to a free flowing powder. The final catalyst weight was 1093 pounds (497 kg). The catalyst can have a final zirconium loading of 0.40% and an aluminum loading of 12.0%.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume of a porous support is well known in the art. Details of one of these procedures is discussed in Volume 1, Experimental Methods in Catalytic Research (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1. component to the transition metal component is preferably in the range of ratios between 0.3:1 to 3:1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See, for example, U.S. Pat. Nos. 4,543,399, 4,588,790, 5,028,670, 5,352,749, 5,405,922, 5,436,304, 5,453,471 and 5,462,999, all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In one embodiment, the mVLDPE is produced by a process essentially free of a scavenger. As used herein, the term "essentially free" means that during the process of the invention no more than 10 ppm of a scavenger based on the total weight of the recycle stream is present at any given point in time during the process of the invention.

In another embodiment, the mVLDPE is produced by a process essentially free of a scavenger. As used herein, the term "essentially free" means that during the process of the invention no more than 50 ppm of a scavenger based on the total weight of the recycle stream is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment, the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment, during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e., ethylene or propylene) partial pressure. The preferred mole percent of the monomer, ethylene or propylene, is from about 25 to 90 mole percent and the monomer partial pressure is in the range of from about 75 psia (520 kPa) to about 300 psia (2100 kPa), which are typical conditions in a gas phase polymerization process.

When a scavenger is utilized, the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state. In one embodiment the scavenger can be introduced once, intermittently or continuously to the reactor system.

The scavenger is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of Al are based on the total amount of scavenger used.

It is also preferred that hydrogen not be added to the system simultaneously with the scavenger. It is also within the scope of this invention that the scavenger can be introduced on a carrier separate from that used when a supported metallocene catalyst system is used in the process of the invention.

Fines for the purpose of this patent specification and appended claims are polymer particles less than 125 $\mu$m in size. Fines of this size can be measured by using a standard 120 mesh unit sieve screen. In a preferred embodiment the amount of scavenger present in the reactor at any given point in time during the process of the invention the level of fines less than 125 $\mu$m is less than 10%, preferably less than 1%, more preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated that scavenger can be intermittently introduced during the process wherein greater than 90%, preferably greater than 95% of all the scavenger introduced is removed from the recycle stream.

It is also contemplated that the catalyst or catalyst system or components thereof can be used upon start-up as a scavenger, however, this would be an expensive procedure.

In the most preferred embodiment, the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment, the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment, the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S. Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly. Fouling can also occur in the recycle gas piping and compressor, but usually accompanies plate and cooler fouling.

To quantify the rate of fouling it is useful to define a fouling factor, F. F is the fraction of the area of a hole that is fouled. If F=0 (0%) then there is no fouling. Conversely, if F=1 (100%) the hole is completely plugged. It is possible to relate the fouling to the pressure drop, $\Delta P$, at a given time in terms of the pressure drop of a clean system, $\Delta P_0$. As fouling increases, $\Delta P$ increases and is larger than the initial pressure drop, $\Delta P_0$. F is given by the following expressions:

$$\text{Plate Fouling:} \quad F = 1 - \sqrt{\frac{\Delta P_0}{\Delta P}} \tag{I}$$

$$\text{Cooler Fouling:} \quad F = 1 - \left(\frac{\Delta P_0}{\Delta P}\right)^{2/5} \tag{II}$$

In general, when F is greater than about 0.3 to about 0.4 (30–40%) a reactor shutdown is inevitable. Preferably, F is less than 40%, preferably less than 30%, even more preferably less than 20%, still more preferably less than 15% and most preferably less than 10% to 0%. The rate of fouling, the change in F as a function of time, is used to quantify fouling. If no fouling occurs the rate of fouling is zero. A minimum acceptable rate of fouling for a commercial operation is about 12 percent/month or 0.4 percent/day, preferably less than 0.3 percent/day, even more preferably less than 0.2 percent/day and most preferably less than 0.1 percent/day.

Particle size is determined by determining the weight of the material collected on a series of U.S. Standard sieves and determining the weight average particle size.

Fines are defined as the percentage of the total distribution passing through 120 mesh standard sieve.

In one embodiment, the process is operated using a metallocene catalyst based on bis(1,3-methyl-n-butyl cyclopentadienyl) zirconium dichloride.

Possible optimizations of the gas phase polymerization process and additional catalyst preparations are disclosed in U.S. Pat. Nos. 5,763,543, 6,087,291, and 5,712,352, and PCT published applications WO 00/02930 and WO 00/02931.

Although the VLPDE polymer component of the mVLDPE/polypropylene blends of the invention has been discussed as a single polymer, blends of two or more VLDPE polymers, preferably two or more mVLDPE polymers, having the properties described herein are also contemplated.

The Polypropylene Component

The polymer blend also includes a polypropylene component ("PP"). The polypropylene component can include one or more polypropylene homopolymer or copolymer or mixture, of any tacticity. Suitable polypropylene copolymers include those copolymers commonly termed random copolymers (RCP) and impact copolymers (ICP). As used herein unless indicated otherwise, the term "polypropylene" includes homopolymers and copolymers.

The term "polypropylene component" also includes polyolefin multi-step reactor products wherein an amorphous ethylene propylene random copolymer is molecularly dispersed in a predominantly semi-crystalline high propylene monomer/low ethylene monomer continuous matrix. Examples of such polymers are described in U.S. Pat. Nos. 5,300,365, 5,212,246 and 5,331,047. These materials, referred to herein as "high rubber content polypropylenes," are commonly known as Catalloy™ resins, and are commercially available from Basell.

Suitable comonomers include ethylene and $\alpha$-olefins, such as $C_{4-20}$ $\alpha$-olefins and preferably ethylene or $C_{4-12}$ $\alpha$-olefins. The $\alpha$-olefin comonomer can be linear or branched, and two or more comonomers can be used, if desired. Thus, the term "copolymer" as used herein includes polymers with more than two types of monomers, such as terpolymers. Examples of suitable comonomers include ethylene, linear $C_{4-2}$ α-olefins, and α-olefins having one or more $C_{1-3}$ alkyl branches. Specific examples include ethylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include ethylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituent on any of $C_{3-5}$, 1-pentene with two methyl substituents in any stoichiometrically acceptable combination on $C_3$ or $C_4$, 3-ethyl-1-pentene, 1-octene, 1-pentene with a methyl substituent on any of $C_3$ or $C_4$, 1-hexene with two methyl substituents in any stoichiometrically acceptable combination on $C_{3-5}$, 1-pentene with three methyl substituents in any stoichiometrically acceptable combination on $C_3$ or $C_4$, 1-hexene with an ethyl substituent on $C_3$ or $C_4$, 1-pentene with an ethyl substituent on $C_3$ and a methyl substituent in a stoichiometrically acceptable position on $C_3$ or $C_4$, 1-decene, 1-nonene, 1-nonene with a methyl substituent on any of $C_{3-9}$, 1-octene with two methyl substituents in any stoichiometrically acceptable combination on $C_{3-7}$, 1-heptene with three methyl substituents in any stoichiometrically acceptable combination on $C_3-C_6$, 1-octene with an ethyl substituent on any of $C_3-C_7$, 1-hexene with two ethyl substituents in any stoichiometrically acceptable combination on $C_3$ or $C_4$, and 1-dodecene. It should be appreciated that the list of comonomers above is merely exemplary, and is not intended to be limiting. It should also be appreciated that terpolymers of propylene can be formed by polymerizing propylene with the above listed comonomers. A particularly preferred comonomer is ethylene.

The weight percentage of comonomer in the polypropylene varies according to the type of polypropylene. A polypropylene homopolymer has no comonomer. A random copolymer can have from a lower limit of 0.5 wt. % or 1 wt. % comonomer to an upper limit of 10 wt. % or 5 wt. % or 4 wt. % or 3 wt. % or 2 wt. % comonomer, with ranges from any lower limit to any upper limit. An impact copolymer can have an overall comonomer content of from a lower limit of 1 wt. % or 3 wt. % or 4 wt. % or 5 wt. % to an upper limit of 15 wt. % or 12 wt. % or 10 wt. % comonomer, with ranges from any lower limit to any upper limit, and a content of comonomer in the rubber phase (based on the total weight of the rubber phase) of from a lower limit of 30 wt. % or 40 wt. % or 45 wt. % to an upper limit of 70 wt. % or 60 wt. % or 55 wt. %, with ranges from any lower limit to any upper. A high rubber content polypropylene can have a comonomer content of from a lower limit of 12 wt. % or 15 wt. % or 20 wt. % or 30 wt. % to an upper limit of 40 wt. % or 30 wt. % or 20 wt. %, with ranges from any lower limit to any greater upper limit. The preferred comonomer is ethylene.

In some embodiments, the polypropylene component is predominantly crystalline, and has a melting point greater than 110° C. or greater than 115° C. or greater than 130° C.

In some embodiments, the polypropylene component is predominantly crystalline, and has a heat of fusion greater than 60 J/g or greater than 80 J/g.

The molecular weight of the polypropylene is not particularly limited and can be, for example, from 10,000 to 5,000,000. Typically, the molecular weight will be from 50,000 to 500,000.

In some embodiments, the polypropylene has a polydispersity index (PDI) of from 1.5 to 40.

The polypropylene can be metallocene catalyzed or Ziegler-Natta catalyzed.

mVLDPE-PP Blends

The mVLDPE/PP blends can be formed using conventional equipment and methods, such a by dry blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly downstream of a polymerization process. Additionally, additives can be included in the blend, in one or more components of the blend, and/or in a product formed from the blend, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); UV stabilizers (e.g., hindered amine light stabilizer such as CHIMASORB™ 944 from Ciba Geigy); heat stabilizers; pigments; colorants; dyes; flame retardants (e.g., magnesium hydroxide, Zerogen™ 50 SP from J. M Huber); and the like.

A particularly desirable additive for roofing membrane applications is a flame retardant. Flame retardants fall into two major categories: (1) additives that are simply compounded, mixed or dissolved in the polymer substrate; and (2) additives that can be chemically coupled to the polymer, known as "reactive flame retardants." Reactive flame retardants are often used in thermoset polymer systems such as polyesters, epoxies and polyurethane's.

When compounding plastics with flame retardants, consideration must be given to how the flame retardant additives influence properties, as well as the compatibility with the host polymer. A flame retardant additive cannot be volatile, or fugitive, that vaporizes before it can perform its intended function. The selection process for flame retardants includes considerations such as melt and vaporization temperatures, compatibility, and thermal decomposition temperature of the flame retardant. One skilled in the art can readily select the appropriate flame retardant or retardants.

Typical flame retardant formulations contain flame retardant additives that can be classified as either halogenated or non-halogenated. Halogenated flame retardants contain a mixture of primary, secondary or tertiary halogen, which can dehydrohalogenate over a wide range of temperatures. The evolution of the hydrogen halide is beneficial to flame retardancy, but limits the maximum temperature at which the polymer compounds can be processed. Examples of halogen containing flame retardants include chlorinated paraffins, and brominated biphenyls such as tetrabromobisphenol A and decabromodiphenyl oxide.

Non-halogenated flame retardants are mainly metallic oxides or hydroxides that contain water of hydration. The selection of inorganic flame retardant rests upon the ability of the flame retardant to retain water under the polymer processing conditions. Examples of these include aluminum trihydride (ATH) and magnesium hydroxide, both of which provide fire retardancy from their inherent water content. ATH tends to liberate water at lower processing temperatures and is less useful for compositions containing a higher melting polymer such as polypropylene. Magnesium hydroxide would be preferred for polypropylene-based compositions in view of its superior hydrolytic stability over a broader temperature range. Antimony trioxide and zinc borate are also used as flame retardant additives in view of their fire retardancy. Antimony trioxide is often used in combination with halogenated flame retardant additives such as tetrabromobisphenol A.

Another family of flame retardants is the halogen and phosphorus containing compounds, such as tris(2,3-dibromopropyl)phosphate and other phosphate esters. Antimony trioioxde is often used in combination with phosphate esters. These combinations are mainly applied in polyvinyl chloride (PVC) and polystyrene formulations. In PVC compounds, the flammable plasticizers are replaced with phosphate and phosphate ester additives.

Mixtures of flame retardants can also be used.

The blends include at least 10 weight percent and up to 90 weight percent of the mVLDPE polymer, and at least 10 weight percent and up to 90 weight percent of the polypropylene component, with these weight percents based on the total weight of the mVLDPE and polypropylene components of the blend. Alternative lower limits of the mVLDPE polymer can be 20%, 30%, 40% or 50% by weight. Alternative upper limits of the mVLDPE polymer can be 80%, 70% or 60% by weight. Ranges from any lower limit to any upper limit are within the scope of the invention.

The mVLDPE polymer, the polypropylene polymer, or both, can be blends of such polymers. I.e., the mVLDPE polymer component of the blend can itself be a blend of two or more VLDPE polymers having the characteristics described herein, and alternatively or additionally, the polypropylene polymer component of the blend can itself be a blend of two or more polypropylene polymers, including the high rubber content polypropylene copolymers described above.

Other polymers can be included in the mVLDPE/PP blends if desired. Thus, in one embodiment, a mVLDPE/PP blend as described herein further includes at least one ethylene alpha-olefin copolymer. The ethylene alpha-olefin copolymer can be a copolymer of ethylene and at least one alpha-olefin, the alpha-olefin being any of the alpha-olefins described above in connection with the mVLDPE polymer, and especially $C_3$–$C_{10}$ alpha-olefins. Preferred ethylene-alpha olefins can have a density of from a lower limit of 0.850 g/cm3 or 0.855 g/cm3 or 0.860 g/cm3 or 0.862 g/cm3 to an upper limit of 0.905 g/cm3 or 0.902 g/cm3, with ranges from any lower limit to any upper limit. The ethylene alpha-olefin can be Ziegler-Natta catalyzed or metallocene catalyzed, and can have an alpha-olefin comonomer content sufficient to impart the desired density. When present, the ethylene alpha-olefin comonomer can be used in an amount of from 1 to 90% by weight, based on the weight of the mVLDPE/PP component, with alternative lower limits of 5 wt. % or 10 wt. % or 20 wt. % or 30 wt. % or 40 wt. % and alternative upper limits of 80 wt. % or 70 wt. % or 60 wt. % or 50 wt. %.

Membranes

Polymer blends of the present invention are particularly suitable for applications such as for industrial roofing membranes, geomembranes, pond liners, and the like. Typical membranes have a thickness in the range of 0.1 to 10 mm, with a membranes of thickness 0.5 to 5 mm, or 1 to 2 mm, being particularly common. The membranes can include one or more layers of the polymer blends described herein, and optionally one or more additional layers, such as reinforcing layers or scrim layers. Such membranes can be formed by any conventional means, such as by extrusion or calendering. In a typical method, the polymer blend is compounded in an extruder with any desired additives, pelletized, and converted to a flat membrane. Multi-layer membranes can be formed by any conventional means of adhering such layers, such as forming one of the layers separately in an extruder, and laminating the first layer with a reinforcing scrim layer and a second layer in an extruder or a calendering process to form the composite.

It has been surprisingly found that membranes formed from polymer blends of the invention exhibit improved properties, particularly improved tensile strength and tear properties, relative to membranes formed of polypropylene/metallocene plastomer blends. As used herein, the term "plastomer" refers to ethylene/alpha-olefin copolymers having a density ranging from 0.860 g/cm$^3$ to 0.905 g/cm$^3$ and alpha-olefin from C3 to C20. Typical plastomers include EXACT™ plastomers available from ExxonMobil Chemical Co., Houston, Tex.

Membranes can also be composite structures; i.e., structures including two or more layers. Thus, in one embodiment, the present invention is directed to composite structures having first and second layers formed of any of the mVLDPE/polypropylene blends described herein, and an intermediate layer, such as an intermediate polymeric reinforcing layer. Suitable intermediate layers can be, for example, polyester fabric, polypropylene fabric etc.

EXAMPLES

Materials and Methods

Metallocene catalysts for the polymerization of the mVLDPE were prepared according to the methods as described above for an unbridged bis-Cp structure (such as bis (1,3-methyl-n-butyl cyclopentadienyl) zirconium dichloride).

Tensile strength values (tensile at yield, tensile at break, elongation at yield and elongation at break) were measured in accordance with ASTM D412.

100% Modulus was determined according to ASTM D412.

Tear Die C was determined according to ASTM D624.

The term "melt index" as used herein refers to the melt flow rate $I_{2.16}$ at 190° C. according to ASTM D-1238, condition E. The term "MFR" as used herein refers to the melt flow rate $I_{2.16}$ at 230° C. according to ASTM D-1238, condition L. This use of the terms "melt index" and "MFR" is believed to be consistent with conventional usage in the polyethylene and polypropylene fields, respectively.

Heat Weld Peel Strength was determined as follows. Samples of the composite membrane were cut into rectangular strips of 150 mm by 150 mm. Two of these composite structures were placed on top of each other with a 12 mm overlap. A strip of Mylar was placed on one edge of the assembly to form a tab. The arrangement is such that the black bottom ply of the top composite is in contact with the white top ply of the bottom composite. The two composite membranes were heat welded along the black/white interface by using a hand held heat gun that can supply air at 700° F. (370° C.). A constant pressure from a 1-kg roller was applied at the interface during heat welding. Strips of test specimens about 100 mm long were cut from the edge containing the Mylar tab. The heat welded composite was pulled apart at the tab in an Instron testing machine using a cross head speed of 50 mm/min. The maximum force was recorded and converted to peel strength.

The ACD protocol is an analytical-scale TREF (Temperature Rising Elution Fractionation) test for semi-crystalline copolymers to characterize the composition distribution (CD). A sample is dissolved in a good solvent, cooled slowly to allow crystallization on a support, and then re-dissolved and washed from the support by heating during elution. Polymer chains are fractionated by differences in their crystallization temperature in solution, which is a function of composition (and defect structure). A mass detector provides concentration vs. elution temperature data; CD characterization is obtained by applying a calibration curve (i.e., mole % comonomer vs. temperature) established using narrow-CD standards. Two in-house Visual Basic programs are used for data acquisition and analysis.

There are really two distributions provided by the ACD test:

Solubility Distribution (weight fraction vs. solubility temperature)—measured directly.

Composition Distribution (weight fraction vs. comonomer content)—obtained by applying the calibration curve to the solubility distribution.

Emphasis is usually placed on characterization of the CD. However, the solubility distribution can be of equal or greater importance when:

A calibration curve has not been established for the polymer of interest.

The MW of the sample is low, or the MWD is broad enough that a significant portion of the sample is low MW (M<20k). Under these circumstances, the reported CD is influenced by the MW-dependence of solubility. The calibration curve must be corrected for the effect of MW to give the true CD, which requires a priori knowledge of the relative influence of MW and composition on solubility for a given sample. In contrast, the solubility distribution correctly accounts for contributions from both effects, without trying to separate them.

Note that the solubility distribution should depend on solvent type and crystallization/dissolution conditions. If correctly calibrated, the CD should be independent of changes in these experimental parameters.

Composition Distribution Breadth Index (CDBI) was measured using the following instrumentation: ACD: Modified Waters 150-C for TREF (Temperature Rising Elution Fractionation) analysis (includes crystallization column, by-pass plumbing, timing and temperature controllers); Column: 75 micron glass bead packing in (High Pressure Liquid Chromotography) HPLC-type column; Coolant: Liquid Nitrogen; Software: "A-TREF" Visual Basic programs; and Detector: Polymer Laboratories ELS-1000. Run conditions for the CDBI measurements were as follows:

GPC settings

| | |
|---|---|
| Mobile phase: | TCE (tetrachlororethylene) |
| Temperature: | column compartment cycles 5–115° C., injector compartment at 115° C. |
| Run time: | 1 hr 30 min |
| Equilibration time: | 10 min (before each run) |
| Flow rate: | 2.5 mL/min |
| Injection volume: | 300 µL |
| Pressure settings: | transducer adjusted to 0 when no flow, high pressure cut-off set to 30 bar |

Temperature controller settings.

Initial Temperature: 115° C.
Ramp 1 Temperature: 5° C. Ramp time = 45 min Dwell time = 3 min
Ramp 2 Temperature: 115° C. Ramp time = 30 min Dwell time = 0 min
Alternative temperature controller settings if two peaks are not exhibited in a TREF measurement.

Initial Temperature: 115° C.
Ramp 1 Temperature: 5° C. Ramp time = 12 hrs Dwell time = 3 min
Ramp 2 Temperature: 115° C. Ramp time = 12 hrs Dwell time = 0 min Temperature controller settings.

Initial Temperature: 115° C.

Ramp 1 Temperature: 5° C. Ramp time=45 min Dwell time=3 min

Ramp 2 Temperature: 115° C. Ramp time=30 min Dwell time=0 min

Alternative temperature controller settings if two peaks are not exhibited in a TREF measurement.

Initial Temperature: 115° C.

Ramp 1 Temperature: 5° C. Ramp time=12 hrs Dwell time=3 min

Ramp 2 Temperature: 115° C. Ramp time=12 hrs Dwell time=0 min

In some case, longer ramp times may be needed to show two peaks in a TREF measurement.

| ELS settings | |
|---|---|
| Nebulizer temperature: | 120° C. |
| Evaporator temperature: | 135° C. |
| Gas flow rate: | 1.0 slm (standard liters per minute) |
| Heated transfer line temperature: | 120° C. |

Melt Index was determined according to ASTM D-1238-95. Melt index is reported in units of g/10 min, or the numerically equivalent units of dg/min.

Density (g/cm$^3$) was determined using chips cut from plaques compression molded in accordance with ASTM D-1928-96 Procedure C, aged in accordance with ASTM D618 Procedure A, and measured according to ASTM D1505-96.

In the following Examples, resins produced by various suppliers were used to demonstrate the unique and advantageous properties of the polymer blend compositions and membranes of the present invention. It should be understood that the specific numerical values of various parameters of these resins described below are nominal values.

EXACT™ 0201 is an ethylene/octene plastomer made using metallocene catalyst, having a nominal density of 0.902 g/cm$^3$ and a Melt Index ($I_{2.16}$, 190° C.) of 1.1 g/10 min, available from ExxonMobil Chemical Co., Houston, Tex.

EXCEED™ ECD-321 is a gas-phase metallocene produced VLDPE ethylene/hexene copolymer with a Melt Index ($I_{2.16}$, 190° C.) of 1.0 g/10 min, a density of 0.912 g/cm$^3$, a melting point of 116.5° C., a CDBI of approximately 60–80%, and an MWD (Mw/Mn) of approximately 2.5–2.6, available from ExxonMobil Chemical Co., Houston, Tex.

ESCORENE™ 2232 is an isotactic polypropylene homopolymer having an MFR ($I_{2.16}$, 230° C.) of 3.0 g/10 min, available from ExxonMobil Chemical Co., Houston, Tex.

ESCORENE™ 9272 is an istotactic polypropylene random copolymer having an MFR ($I_{2.16}$, 230° C.) of 2.9 g/10 min, available from ExxonMobil Chemical Co., Houston, Tex.

ESCORENE™ 8102 is an isotactic polypropylene impact copolymer having an MFR ($I_{2.16}$, 230° C.) of 1.9 g/10 min, available from ExxonMobil Chemical Co., Houston, Tex.

In the data tables following, the names of several commercial EXCEED™, EXACT™ and ESCORENE™ resins are abbreviated. Each occurrence of the abbreviated name should be interpreted as identifying a particular EXCEED™, EXACT™ or ESCORENE™ resin. EXCEED™, EXACT™ and ESCORENE™ are trademarks of ExxonMobil Chemical Co., Houston, Tex.

Example 1

Producing mVLDPE

The EXCEED™ 321 mVLDPE polymer was prepared using gas phase polymerization using metallocene catalyst systems as described above. The polymerizations were conducted in the continuous gas phase fluidized bed reactors. The fluidized beds of those reactors were made up of polymer granules. The gaseous feed streams of ethylene and hydrogen were introduced below each reactor bed into the recycle gas line. Hexene comonomer was introduced below the reactor bed. An inert hydrocarbon (isopentane) was also introduced to each reactor in the recycle gas line, to provide additional heat capacity to the reactor recycle gases. The individual flow rates of ethylene, hydrogen and hexene comonomer were controlled to maintain fixed composition targets. The concentration of the gases were measured by an on-line gas chromatograph to ensure relatively constant composition in the recycle gas stream.

The solid catalyst was injected directly into the fluidized beds using purified nitrogen. The catalyst rates were adjusted to maintain constant production rate. The reacting beds of growing polymer particles were maintained in a fluidized state by a continuous flow of the make up feed and recycle gas through each reaction zone. To maintain constant reactor temperatures, the temperature of the recycle gas was continuously adjusted up or down to accommodate any changes in the rate of heat generation due to the polymerization.

The fluidized bed was maintained at a constant height by withdrawing a portion of the bed at a rate equal to the formation of the particulate product. The product was transferred to a purger vessel to remove entrained hydrocarbons.

Example 2

White Ply Compound

White ply compounds were prepared, using magnesium hydroxide as a flame retardant, and a titanium dioxide pigment to impart the white color. The compound also contained an antioxidant (IRGANOX™ 1010) and an ultra-violet light stabilizer (CHIMASORB™ 944).

The white ply compound formulation is shown in Table 1. The amounts shown in Table 1 are parts by weight rather than percentages. The mVLDPE and polypropylene components are specified generically; specific grades are shown in subsequent examples.

TABLE 1

White Ply Compound Formulation

| Component | Source | Parts by Weight |
|---|---|---|
| mVLDPE | ExxonMobil | 60 |
| Polypropylene | ExxonMobil | 16 |
| Magnesium Hydroxide (ZEROGEN ™ 50 SP) | J. M. Huber | 25 |
| Titanium Dioxide (TIONA ™ RCL-6) | Millenium Chemical | 2.0 |
| Antioxidant (IRGANOX ™ 1010) | Ciba Geigy | 0.5 |
| UV Stabilizer (CHIMASORB ™ 944) | Ciba Geigy | 0.25 |

Although Table 1 shows an exemplary formulation having specific amounts of various components, one skilled in the art will recognize that the various amounts can be varied, based on the amounts of the polymer components as described above, and the desired amounts of the various additives.

The compound of Table 1 was prepared using a two-step mixing process, as follows. To more effectively disperse the magnesium hydroxide in the compound, a master batch containing 50 weight % of the mVLDPE polymer and 50 weight % of the magnesium hydroxide was blended in a 7200 cm$^3$ Banbury internal mixer. The polymer and magnesium hydroxide were charged into the mixing chamber of the internal mixer with the rotors running at 5 to 10 rpm. The mixing intensity was gradually increased until the polymer fluxed (melted) in the compound. Mixing was continued for an additional 2 minutes after the polymer flux. The compound was discharged from the internal mixer and ground into fine pellets.

Next, the granulated magnesium hydroxide/mVLDPE master batch was combined with the remaining components of Table 1, including additional mVLDPE to achieve the noted amount, and the mixture was extruded using a 30 mm ZSK twin screw extruder. The extruder zones varied in temperature from 160° C. to 210° C. The compound was pelletized and compression molded into 20 mil (0.5 mm) thick pads, under conditions of 200° C. and 8 minutes cycle time.

Example 3

Black Ply Compound

Black ply compounds were prepared using a blend of mVLDPE and polypropylene, with a black concentrate and an antioxidant (IRGANOX™ 1010).

The black ply compound formulation is shown in Table 2. The amounts shown in Table 2 are parts by weight rather than percentages. The mVLDPE and polypropylene components are specified generically; specific grades are shown in subsequent examples.

TABLE 2

Black Ply Compound Formulation

| Component | Source | Parts by Weight |
|---|---|---|
| mVLDPE | ExxonMobil | 80 |
| Polypropylene | ExxonMobil | 20 |

TABLE 2-continued

Black Ply Compound Formulation

| Component | Source | Parts by Weight |
|---|---|---|
| Antioxidant (IRGANOX ™ 1010) | Ciba Geigy | 0.5 |
| Black Concentrate | Ferro | 0.1 |

Although Table 2 shows an exemplary formulation having specific amounts of various components, one skilled in the art will recognize that the various amounts can be varied, based on the amounts of the polymer components as described above, and the desired amounts of the various additives.

The compound of Table 2 was prepared in a single step process using a 30 mm ZSK twin screw extruder. The extruder zones varied in temperature from 160° C. to 210° C. The compound was pelletized and compression molded into 20 mil (0.5 mm) thick pads, under conditions of 200° C. and 8 minutes cycle time.

Examples 4A and 4B

Blends with Polypropylene Homopolymer (HPP)

White and black plies were prepared as described in Examples 2 and 3, using a polypropylene homopolymer as the polypropylene component, and several properties of the unreinforced plies were measured. The polypropylene homopolymer used was ESCORENE™ 2232.

In Example 4A, the compound included an mVLDPE, EXCEED™ 321, and the polypropylene homopolymer. The properties of the white and black plies are shown in Table 3.

Example 4B is a comparative example. In Example 4B, a metallocene plastomer, EXACT™ 0201, was used in place of the mVLDPE. The properties of the plies are also shown in Table 3.

TABLE 3

Properties of Unreinforced Plies, Using PP Homopolymer (HPP)

| | Example 4A: mVLDPE/HPP | Example 4B m-plastomer/HPP (comparative) |
|---|---|---|
| White Ply | | |
| MFR ($I_{2.16}$, 230° C.) (g/10 min) | 1.4 | 1.8 |
| 100% Modulus (MPa) | 13.4 | 9.8 |
| Tensile at Yield (MPa) | 14.1 | 10.4 |
| Tensile at Break (MPa) | 24.8 | 24.9 |
| Elongation at Yield (%) | 40 | 50 |
| Elongation at Break (%) | 905 | 1495 |
| Tear Die C (N/mm) | 595 | 535 |
| Black Ply | | |
| MFR ($I_{2.16}$, 230° C.) (g/10 min) | 2.2 | 2.6 |
| 100% Modulus (MPa) | 14.2 | 9.3 |
| Tensile at Yield (MPa) | 14.3 | 8.7 |
| Tensile at Break (MPa) | 42 | 32.7 |
| Elongation at Yield (%) | 75 | 70 |
| Elongation at Break (%) | 900 | 2040 |
| Tear Die C (N/mm) | 595 | 542 |

As shown in Table 3, the inventive mVLDPE/polypropylene homopolymer blends show superior tensile and tear properties in both white ply and black ply compounds, compared to metallocene plastomer compounds of approximately the same MFR.

Examples 5A and 5B

Blends with Polypropylene Random Copolymer (RCP)

White and black plies were prepared as described in Examples 2 and 3, using a polypropylene random copolymer as the polypropylene component, and several properties of the unreinforced plies were measured. The polypropylene random copolymer used was ESCORENE™ 9272.

In Example 5A, the compound included an mVLDPE, EXCEED™ 321, and the polypropylene random copolymer. The properties of the white and black plies are shown in Table 4.

Example 5B is a comparative example. In Example 5B, a metallocene plastomer, EXACT™ 0201, was used in place of the mVLDPE. The properties of the plies are also shown in Table 4.

TABLE 4

Properties of Unreinforced Plies, Using PP Random Copolymer (RCP)

| | Example 5A: mVLDPE/RCP | Example 5B m-plastomer/RCP (comparative) |
|---|---|---|
| White Ply | | |
| MFR ($I_{2.16}$, 230° C.) (g/10 min) | 1.6 | 1.7 |
| 100% Modulus (MPa) | 12.8 | 8.8 |
| Tensile at Yield (MPa) | 13.7 | 9.2 |
| Tensile at Break (MPa) | 23.4 | 23.2 |
| Elongation at Yield (%) | 50 | 60 |
| Elongation at Break (%) | 930 | 1525 |
| Tear Die C (N/mm) | 595 | 450 |
| Black Ply | | |
| MFR ($I_{2.16}$, 230° C.) (g/10 min) | 2.2 | 2.4 |
| 100% Modulus (MPa) | 12.2 | 9.0 |
| Tensile at Yield (MPa) | 12.5 | 8.9 |
| Tensile at Break (MPa) | 39.8 | 25.3 |
| Elongation at Yield (%) | 75 | 85 |
| Elongation at Break (%) | 930 | 1695 |
| Tear Die C (N/mm) | 515 | 510 |

As shown in Table 4, the inventive mVLDPE/polypropylene random copolymer blends show superior tensile and tear properties in both white ply and black ply compounds, compared to metallocene plastomer compounds of approximately the same MFR.

Examples 6A and 6B

Blends with Polypropylene Impact Copolymer (ICP)

White and black plies were prepared as described in Examples 2 and 3, using a polypropylene impact copolymer as the polypropylene component, and several properties of the unreinforced plies were measured. The polypropylene impact copolymer used was ESCORENE™ 8102.

In Example 6A, the compound included an mVLDPE, EXCEED™ 321, and the polypropylene impact copolymer. The properties of the white and black plies are shown in Table 5.

Example 6B is a comparative example. In Example 6B, a metallocene plastomer, EXACT™ 0201, was used in place of the mVLDPE. The properties of the plies are also shown in Table 5.

TABLE 5

Properties of Unreinforced Plies, Using PP Impact Copolymer (ICP)

| | Example 6A: mVLDPE/ICP | Example 6B m-plastomer/ICP (comparative) |
|---|---|---|
| White Ply | | |
| MFR (I2.16, 230° C.) (g/10 min) | 1.6 | 1.6 |
| 100% Modulus (MPa) | 11.3 | 6.9 |
| Tensile at Yield (MPa) | 11.6 | 7.5 |
| Tensile at Break (MPa) | 20.5 | 20.7 |
| Elongation at Yield (%) | 45 | 45 |
| Elongation at Break (%) | 900 | 1785 |
| Tear Die C (N/mm) | 535 | 415 |
| Black Ply | | |
| MFR (I2.16, 230° C.) (g/10 min) | 2.2 | 2.4 |
| 100% Modulus (MPa) | 9.3 | 7.1 |
| Tensile at Yield (MPa) | 9.4 | 6.9 |
| Tensile at Break (MPa) | 33.0 | 27.2 |
| Elongation at Yield (%) | 75 | 60 |
| Elongation at Break (%) | 900 | 2050 |
| Tear Die C (N/mm) | (no data) | 450 |

As shown in Table 5, the inventive mVLDPE/polypropylene homopolymer blends show superior tensile and tear properties in the white ply compound, and superior tensile properties in the black ply compound, compared to metallocene plastomer compounds of approximately the same MFR.

Example 7

Scrim Reinforced Composite Membranes

Composite membranes were formed by combining a white top ply according to Example 2 and a corresponding black bottom ply according to Example 3, with 1 mil (25 μm) thick polyester scrim fabric between the white and black plies. The polyester scrim fabric was obtained from Highland Industries. The composite assembly was then compression molded in a 43 mil (1.1 mm) mold cavity at 200° C. for 8 minutes.

Properties of reinforced membranes are shown in the following examples. One skilled in the art will appreciate that the enhanced tensile and tear properties of membranes of the present invention are more readily apparent in the unreinforced membrane properties described above.

Examples 8A and 8B

Composite Membranes with Polypropylene Homopolymer (HPP)

Composite membranes were formed according to Example 7, using the white and black plies of Examples 4A and 4B. Example 8B is a comparative example. The properties of the scrim-reinforced composite membranes are shown in Table 6.

TABLE 6

Properties of Reinforced Composite Membranes Using PP Homopolymer (HPP)

| | Example 8A: mVLDPE/HPP | Example 8B m-plastomer/HPP (comparative) |
|---|---|---|
| Tensile at Yield (MPa) | 33.6 | 30.1 |
| Elongation at Break (%) | 57 | 170 |
| Heat Weld Peel Strength (N/mm) | 120 | 130 |

Examples 9A and 9B

Composite Membranes with Polypropylene Random Copolymer (RCP)

Composite membranes were formed according to Example 7, using the white and black plies of Examples 5A and 5B. Example 9B is a comparative example. The properties of the scrim-reinforced composite membranes are shown in Table 7.

TABLE 7

Properties of Reinforced Composite Membranes Using PP Random Copolymer (RCP)

| | Example 9A: mVLDPE/HPP | Example 9B m-plastomer/HPP (comparative) |
|---|---|---|
| Tensile at Yield (MPa) | 28.1 | 28.2 |
| Elongation at Break (%) | 63 | 75 |
| Heat Weld Peel Strength (N/mm) | 92 | 135 |

Examples 10A and 10B

Composite Membranes with Polypropylene Impact Copolymer (ICP)

Composite membranes were formed according to Example 7, using the white and black plies of Examples 6A and 6B. Example 10B is a comparative example. The properties of the scrim-reinforced composite membranes are shown in Table 8.

TABLE 8

Properties of Reinforced Composite Membranes Using PP Impact Copolymer (ICP)

| | Example 10A: mVLDPE/ICP | Example 10B m-plastomer/ICP (comparative) |
|---|---|---|
| Tensile at Yield (MPa) | 28.5 | 28.9 |
| Elongation at Break (%) | 180 | 57 |
| Heat Weld Peel Strength (N/mm) | 184 | 148 |

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

What is claimed is:

1. A membrane formed from a polymer blend composition comprising:
   (a) a metallocene-catalyzed VLDPE copolymer of ethylene and one or more $C_3$–$C_{20}$ alpha olefin comonomers, the copolymer having a density of from 0.906 g/cm$^3$ to 0.915 g/cm$^3$, and
   (b) a polypropylene polymer component,
   wherein components (a) and (b) are present in the blend composition in a weight ratio of from 9:1 to 1:9.

2. The membrane of claim 1, wherein the propylene polymer component comprises polypropylene selected from: propylene homopolymers; random copolymers of propylene and one or more comonomers selected from ethylene and $C_3$–$C_{20}$ alpha olefins; impact copolymers of propylene and one or more comonomers selected from ethylene and $C_3$–$C_{20}$ alpha olefins; high rubber content polypropylenes; and mixtures thereof.

3. The membrane of claim 1, wherein the propylene polymer component comprises polypropylene selected from: propylene homopolymers; random copolymers of propylene and ethylene; impact copolymers of propylene and ethylene; reactor alloys of ethylene-propylene rubber and crystalline polypropylene; and mixtures thereof.

4. The membrane of claim 1, wherein the polypropylene polymer component comprises polypropylene/ethylene copolymer having a polymerized ethylene content of from 0.5 to 40 wt. %.

5. The membrane of claim 1, wherein the polypropylene polymer component comprises polypropylene/ethylene random copolymer having a polymerized ethylene content of from 1 to 10 wt. %.

6. The membrane of claim 1, wherein the polypropylene polymer component comprises polypropylene/ethylene impact copolymer having an overall polymerized ethylene content of from 1 to 15 wt. %.

7. The membrane of claim 1, wherein the weight ratio of component (a) to component (b) is from 9:1 to 1:1.

8. The membrane of claim 1, wherein the metallocene catalyzed VLDPE copolymer is produced using an unbridged bis-Cp metallocene catalyst system.

9. The membrane of claim 1, wherein the metallocene catalyzed VLDPE copolymer has:
   (i) a comonomer content of from 5 to 15 wt. %,
   (ii) a composition distribution breadth index of from 50% to 85%,
   (iii) a molecular weight distribution Mw/Mn of from 2 to 3,
   (iv) a molecular weight distribution Mz/Mw of less than 2, and
   (v) a bimodal composition distribution.

10. The membrane of claim 1, wherein the polymer blend composition further comprises (c) at least one ethylene, alpha-olefin copolymer in an amount such that the weight ratio of (c) to the sum of (a) and (b) is from 0.1:9 9:1.

11. The membrane of claim 10, wherein the at least one ethylene alpha-olefin copolymer has a density of from 0.850 g/cm$^3$ to 0.905 g/cm$^3$ and is selected from metallocene-catalyzed copolymers of ethylene and at least one $C_3$ to $C_{10}$ alpha-olefin, Ziegler-Natta catalyzed copolymers of ethylene and at least one $C_3$ to $C_{10}$ alpha-olefin, and mixtures thereof.

12. The membrane of claim 1, wherein the polymer blend further comprises a flame retardant in an amount of 1 to 50 wt. %, based on the total weight of the polymer blend composition.

13. A membrane formed from a polymer blend composition comprising:
   (a) a metallocene-catalyzed VLDPE copolymer of ethylene and one or more $C_3$–$C_{12}$ alpha olefin comonomers, the copolymer having a density of from 0.906 g/cm$^3$ to 0.915 g/cm$^3$, and
   (b) a polypropylene polymer component comprising at least one of a polypropylene homopolymer and a polypropylene/ethylene copolymer having a polymerized ethylene content of from 0.5 to 40 wt. %,
   wherein components (a) and (b) are present in the blend composition in a weight ratio of from 9:1 to 1:1.

14. The membrane of claim 13, wherein the propylene polymer component comprises polypropylene selected from: propylene homopolymers; random copolymers of propylene ethylene; impact copolymers of propylene and ethylene; reactor alloys of ethylene-propylene rubber and crystalline polypropylene; and mixtures thereof.

15. The membrane of claim 13, wherein the polypropylene polymer component comprises polypropylene/ethylene random copolymer having a polymerized ethylene content of from 1 to 10 wt. %.

16. The membrane of claim 13, wherein the polypropylene polymer component comprises polypropylene/ethylene impact copolymer having an overall polymerized ethylene content of from 1 to 15 wt. %.

17. The membrane of claim 13, wherein the metallocene catalyzed VLDPE copolymer is produced using an unbridged bis-Cp metallocene catalyst system.

18. The membrane of claim 13, wherein the metallocene catalyzed VLDPE copolymer has:
   (i) a comonomer content of from 5 to 15 wt. %,
   (ii) a composition distribution breadth index of from 50% to 85%,
   (iii) a molecular weight distribution Mw/Mn of from 2 to 3,
   (iv) a molecular weight distribution Mz/Mw of less than 2, and
   (v) a bimodal composition distribution.

19. The membrane of claim 13, wherein the polymer blend composition further comprises (c) at least one ethylene, alpha-olefin copolymer in an amount such that the weight ratio of (c) to the sum of (a) and (b) is from 0.1:9 9:1.

20. The membrane of claim 19, wherein the at least one ethylene alpha-olefin copolymer has a density of from 0.850 g/cm$^3$ to 0.905 g/cm$^3$ and is selected from metallocene-catalyzed copolymers of ethylene and at least one $C_3$ to $C_{10}$ alpha-olefin, Ziegler-Natta catalyzed copolymers of ethylene and at least one $C_3$ to $C_{10}$ alpha-olefin, and mixtures thereof.

21. The membrane of claim 13, wherein the polymer blend further comprises a flame retardant in an amount of 1 to 50 wt. %, based on the total weight of the polymer blend composition.

22. A composite membrane comprising first and second layers, and an intermediate polymeric reinforcing layer disposed between the first and second layers, wherein the first and second layers are the same or different and are formed from a polymer blend composition comprising:
   (a) a metallocene-catalyzed VLDPE copolymer of ethylene and one or more $C_3$–$C_{20}$ alpha olefin comonomers, the copolymer having a density of from 0.906 g/cm$^3$ to 0.915 g/cm$^3$, and
   (b) a polypropylene polymer component,
   wherein components (a) and (b) are present in the blend composition in a weight ratio of from 9:1 to 1:9.

23. The composite membrane of claim 22, wherein the propylene polymer component comprises polypropylene selected from: propylene homopolymers; random copolymers of propylene and one or more comonomers selected from ethylene and $C_3$–$C_{20}$ alpha olefins; impact copolymers of propylene and one or more comonomers selected from ethylene and $C_3$–$C_{20}$ alpha olefins; high rubber content polypropylenes; and mixtures thereof.

24. The composite membrane of claim 22, wherein the propylene polymer component comprises polypropylene selected from: propylene homopolymers; random copolymers of propylene and ethylene; impact copolymers of propylene and ethylene; reactor alloys of ethylene-propylene rubber and crystalline polypropylene; and mixtures thereof.

25. The composite membrane of claim 22, wherein the polypropylene polymer component comprises polypropylene/ethylene copolymer having a polymerized ethylene content of from 0.5 to 40 wt. %.

26. The membrane of claim 22, wherein the polypropylene polymer component comprises polypropylene/ethylene random copolymer having a polymerized ethylene content of from 1 to 10 wt. %.

27. The composite membrane of claim 22, wherein the polypropylene polymer component comprises polypropylene/ethylene impact copolymer having a polymerized ethylene content of from 1 to 15 wt. %.

28. The membrane of claim 22, wherein the weight ratio of component (a) to component (b) is from 9:1 to 1:1.

29. The membrane of claim 23, wherein the metallocene catalyzed VLDPE copolymer is produced using an unbridged bis-Cp metallocene catalyst system.

30. The membrane of claim 22, wherein the metallocene catalyzed VLDPE copolymer has:
   (i) a comonomer content of from 5 to 15 wt. %,
   (ii) a composition distribution breadth index of from 50% to 85%,
   (iii) a molecular weight distribution Mw/Mn of from 2 to 3,
   (iv) a molecular weight distribution Mz/Mw of less than 2, and
   (v) a bimodal composition distribution.

31. The membrane of claim 22, wherein the polymer blend composition further comprises (c) at least one ethylene, alpha-olefin copolymer in an amount such that the weight ratio of (c) to the sum of (a) and (b) is from 0.1:9 9:1.

32. The membrane of claim 31, wherein the at least one ethylene alpha-olefin copolymer has a density of from 0.850 g/cm³ to 0.905 g/cm³ and is selected from metallocene-catalyzed copolymers of ethylene and at least one $C_3$ to $C_{10}$ alpha-olefin, Ziegler-Natta catalyzed copolymers of ethylene and at least one $C_3$ to $C_{10}$ alpha-olefin, and mixtures thereof.

33. The membrane of claim 22, wherein the polymer blend further comprises a flame retardant in an amount of 1 to 50 wt. %, based on the total weight of the polymer blend composition.

34. A membrane formed from a polymer blend composition comprising:
   (a) a copolymer of ethylene and one or more $C_3$–$C_{20}$ alpha olefin comonomers, the copolymer having:
      (i) a comonomer content of from 5 to 15 wt. %,
      (ii) a density of less than 0.916 g/cm³,
      (iii) a composition distribution breadth index of from 50% to 85%,
      (iv) a molecular weight distribution Mw/Mn of from 2 to 3,
      (v) a molecular weight distribution Mz/Mw of less than 2, and
      (vi) a bimodal composition distribution; and
   (b) a polypropylene polymer component,
wherein components (a) and (b) are present in the blend composition in a weight ratio of 9:1 to 1:9.

35. The membrane of claim 34, wherein the propylene polymer component comprises polypropylene selected from: propylene homopolymers; random copolymers of propylene and one or more comonomers selected from ethylene and $C_3$–$C_{20}$ alpha olefins; impact copolymers of propylene and one or more comonomers selected from ethylene and $C_3$–$C_{20}$ alpha olefins; high rubber content polypropylenes; and mixtures thereof.

36. The membrane of claim 34, wherein the propylene polymer component comprises polypropylene selected from: propylene homopolymers; random copolymers of propylene and ethylene; impact copolymers of propylene and ethylene; reactor alloys of ethylene-propylene rubber and crystalline polypropylene; and mixtures thereof.

37. The membrane of claim 34, wherein the polypropylene polymer component comprises polypropylene/ethylene copolymer having a polymerized ethylene content of from 0.5 to 40 wt. %.

38. The membrane of claim 34, wherein the polypropylene polymer component comprises polypropylene/ethylene random copolymer having a polymerized ethylene content of from 1 to 10 wt. %.

39. The membrane of claim 34, wherein the polypropylene polymer component comprises polypropylene/ethylene impact copolymer having a polymerized ethylene content of from 1 to 15 wt. %.

40. The membrane of claim 34, wherein the weight ratio of component (a) to component (b) is from 9:1 to 1:1.

41. The membrane of claim 34, wherein the metallocene catalyzed VLDPE copolymer is produced using an unbridged bis-Cp metallocene catalyst system.

42. The membrane of claim 34, wherein the polymer blend composition further comprises (c) at least one ethylene, alpha-olefin copolymer in an amount such that the weight ratio of (c) to the sum of (a) and (b) is from 0.1:9 9:1.

43. The membrane of claim 42, wherein the at least one ethylene alpha-olefin copolymer has a density of from 0.850 g/cm³ to 0.905 g/cm³ and is selected from metallocene-catalyzed copolymers of ethylene and at least one $C_3$ to $C_{10}$ alpha-olefin, Ziegler-Natta catalyzed copolymers of ethylene and at least one $C_3$ to $C_{10}$ alpha-olefin, and mixtures thereof.

44. The membrane of claim 34, wherein the polymer blend further comprises a flame retardant in an amount of 1 to 50 wt. %, based on the total weight of the polymer blend composition.

45. A composite membrane comprising first and second layers, and an intermediate polymeric reinforcing layer disposed between the first and second layers, wherein the first and second layers are the same or different and are formed from a polymer blend composition comprising:
   (a) a metallocene-catalyzed VLDPE copolymer of ethylene and one or more $C_3$–$C_{20}$ alpha olefin comonomers, the copolymer having:
      (i) a comonomer content of from 5 to 15 wt. %,
      (ii) a density of less than 0.916 g/cm³,
      (iii) a composition distribution breadth index of from 50% to 85%,
      (iv) a molecular weight distribution Mw/Mn of from 2 to 3,
      (v) a molecular weight distribution Mz/Mw of less than 2, and (vi) a bimodal composition distribution; and (b) a polypropylene polymer component, wherein components (a) and (b) are present in the blend composition in a weight ratio of from 9:1 to 1:9.

46. The composite membrane of claim 45, wherein the propylene polymer component comprises polypropylene selected from: propylene homopolymers; random copolymers of propylene and one or more comonomers selected from ethylene and $C_3$–$C_{20}$ alpha olefins; impact copolymers of propylene and one or more comonomers selected from ethylene and $C_3$–$C_{20}$ alpha olefins; high rubber content polypropylenes; and mixtures thereof.

47. The composite membrane of claim 45, wherein the propylene polymer component comprises polypropylene selected from: propylene homopolymers; random copolymers of propylene and ethylene; impact copolymers of propylene and ethylene; reactor alloys of ethylene-propylene rubber and crystalline polypropylene; and mixtures thereof.

48. The composite membrane of claim 45, wherein the polypropylene polymer component comprises polypropylene/ethylene copolymer having a polymerized ethylene content of from 0.5 to 40 wt. %.

49. The membrane of claim 45, wherein the polypropylene polymer component comprises polypropylene/ethylene random copolymer having a polymerized ethylene content of from 1 to 10 wt. %.

50. The composite membrane of claim 45, wherein the polypropylene polymer component comprises polypropylene/ethylene impact copolymer having a polymerized ethylene content of from 1 to 15 wt. %.

51. The membrane of claim 45, wherein the weight ratio of component (a) to component (b) is from 9:1 to 1:1.

52. The membrane of claim 45, wherein the metallocene catalyzed VLDPE copolymer is produced using an unbridged bis-Cp metallocene catalyst system.

53. The membrane of claim 45, wherein the polymer blend composition further comprises (c) at least one ethylene, alpha-olefin copolymer in an amount such that the weight ratio of (c) to the sum of (a) and (b) is from 0.1:9 9:1.

54. The membrane of claim 53, wherein the at least one ethylene alpha-olefin copolymer has a density of from 0.850 g/cm$^3$ to 0.905 g/cm$^3$ and is selected from metallocene-catalyzed copolymers of ethylene and at least one $C_3$ to $C_{10}$ alpha-olefin, Ziegler-Natta catalyzed copolymers of ethylene and at least one $C_3$ to $C_{10}$ alpha-olefin, and mixtures thereof.

55. The membrane of claim 45, wherein the polymer blend further comprises a flame retardant in an amount of 1 to 50 wt. %, based on the total weight of the polymer blend composition.

* * * * *